(12) United States Patent
Abdeen

(10) Patent No.: US 11,613,486 B1
(45) Date of Patent: Mar. 28, 2023

(54) LOW MOISTURE SOLIDS PRODUCED FROM POULTRY PLANT SLUDGE BY A DECANTER CENTRIFUGE SYSTEM

(71) Applicant: Southeastern Environmental Services, LLC, Madison, MS (US)

(72) Inventor: Eddie Jacob Abdeen, Adison, MS (US)

(73) Assignee: Southeastern Environmental Services LLC, Madison, MS (US)

( * ) Notice: Subject to any disclaimer, the term of this patent is extended or adjusted under 35 U.S.C. 154(b) by 26 days.

(21) Appl. No.: 17/115,461

(22) Filed: Dec. 8, 2020

Related U.S. Application Data

(62) Division of application No. 16/153,757, filed on Oct. 6, 2018, now Pat. No. 10,899,647.

(60) Provisional application No. 62/569,195, filed on Oct. 6, 2017.

(51) Int. Cl.
| | |
|---|---|
| *C02F 1/24* | (2006.01) |
| *C02F 103/22* | (2006.01) |
| *C02F 103/32* | (2006.01) |
| *C02F 11/127* | (2019.01) |
| *C02F 11/14* | (2019.01) |
| *B04B 1/20* | (2006.01) |

(52) U.S. Cl.
CPC ............ *C02F 11/14* (2013.01); *B04B 1/2016* (2013.01); *C02F 11/127* (2013.01); *B04B 2001/2091* (2013.01); *C02F 1/24* (2013.01); *C02F 2103/22* (2013.01); *C02F 2103/32* (2013.01)

(58) Field of Classification Search
CPC .. B04B 2001/2091; C02F 1/24; C02F 11/127; C02F 2103/22
See application file for complete search history.

(56) References Cited

U.S. PATENT DOCUMENTS

| | | | |
|---|---|---|---|
| 4,240,578 A | 12/1980 | Jackson | |
| 5,030,359 A * | 7/1991 | Castrantas | C02F 11/13 210/705 |
| 5,156,751 A | 10/1992 | Miller | |
| 5,695,442 A | 12/1997 | Leung et al. | |

(Continued)

FOREIGN PATENT DOCUMENTS

FR 2120537 8/1972

OTHER PUBLICATIONS

Bell, George Ross Arana. "Analysis and Development of a Decanter Centrifuge: Power consumption analysis, development of a composite bowl, and feed accelerator analysis." (2013). (Year: 2013).*

(Continued)

*Primary Examiner* — Bradley R Spies

(57) ABSTRACT

In described embodiments, a method of processing sludge of a poultry plant into solids includes storing sludge in a tank where the sludge is a dissolved air floatation (DAF) float treated with Polymer Chemistry. A polymer is added to the sludge to produce a slurry that is separated into at least one liquid phase and solids in a horizontal decanter centrifuge having a weir ring. In conjunction with operating the centrifuge with a laminar flow, adjusted feed rate and polymer dosing, the system allows for production of low moisture solids (<50%) from the poultry plant DAF float and discharge of a clear liquid phase.

14 Claims, 3 Drawing Sheets

(56) References Cited

U.S. PATENT DOCUMENTS

| | | | |
|---|---|---|---|
| 6,464,875 B1 * | 10/2002 | Woodruff | C02F 3/28 |
| | | | 210/603 |
| 6,749,552 B1 | 6/2004 | Figgener et al. | |
| 2010/0163483 A1 | 7/2010 | Grady et al. | |
| 2012/0021889 A1 | 1/2012 | Eiken | |
| 2014/0054231 A1 | 2/2014 | Spence et al. | |
| 2019/0330088 A1 | 10/2019 | Askelsen et al. | |

OTHER PUBLICATIONS

Carl P. Steele et al., "Elimination of Daf Sludge Disposal Through Resource Recovery", Bird Environmental Systemsand Services, Inc., Norwood, Massachusetts 02062.

* cited by examiner

LOW MOISTURE SOLIDS PRODUCED FROM POULTRY PLANT SLUDGE BY A DECANTER CENTRIFUGE SYSTEM

CROSS-REFERENCE TO RELATED APPLICATIONS

This application is a divisional of U.S. patent application Ser. No. 16/153,757, filed on Oct. 6, 2018, which claims the benefit of the filing date of U.S. provisional application No. 62/569,195, filed on Oct. 6, 2017, the teachings of which are incorporated herein by reference.

BACKGROUND

A variety of wastewater treatment practices are utilized throughout the poultry processing industry. However, a prevalent approach to wastewater pretreatment in the poultry processing industry is the utilization of dissolved air flotation systems ("DAF systems") augmented with various chemicals (e.g. polymers to enhance flocculation and others to manage pH, etc.). DAF systems are used for the reduction of biochemical oxygen demand (BOD), total suspended solids (TSS) and fat, oil and grease (FOG) to comply with regulatory discharge requirements prior to the discharge of wastewater streams to governmental wastewater treatment systems.

The primary components of a typical DAF system are sludge pumps, chemical feed equipment (to apply polymers, etc.), an air compressor, a control panel, and a flotation unit. In the operation of a DAF, influent enters near the tank bottom and exits from the base at the opposite end. Flotation aids (e.g. polymers) are introduced in a mixing chamber at the tank inlet. Float is continuously swept from the liquid surface and discharged over the end wall of the tank. Effluent is recycled at a rate of 30-150% of the influent flow through an air dissolution tank to the feed inlet. In this manner, compressed air at 700-1000 kPa is dissolved in the return flow. After pressure release, minute bubbles with a diameter about 80 micrometers form and attach to solid particles and become enmeshed in sludge flocs, floating them to the surface ("DAF float"). The DAF float is then skimmed from the surface of the wastewater and collected in float tanks for disposal, the primary method of which is currently sub-soil injection.

Without the addition of polymers, solids capture might range from 70-90%. However, removal efficiency increases to an average of 97%, with a polymer dosage of approximately 4.5 kg/t of dry suspended solids because most DAF systems use flotation aids. A DAF system might typically reduce TSS and FOG by about 90 to 99%. In those wastewater streams in which the BOD is not solubilized into water, BOD can be reduced by up to about 75-85% and, in wastewater streams containing high levels of soluble BOD, the reduction of soluble BOD may only be by about 10-40% without chemical augmentation.

Consequently, DAF systems sometimes use chemical augmentation. An example of a system where chemical augmentation of a DAF system is the poultry industry. Chemical augmentation of the DAF system is important to the poultry industry to process the wastewater streams of poultry kill plants that contain blood solubilized therein. Poultry kill plants process large numbers of live animals daily (i.e., a typical poultry plant processes 250,000 birds per day) and generate large volumes of blood. A significant amount of such blood is solubilized into the wastewater stream and becomes a major element of soluble BOD in the stream.

Chemical augmentation of DAF systems might use Metal Salts Chemistry. Historically, the most commonly used treatment aid for addressing solubilized BOD was ferric chloride, ferric sulfate or other metal salts, at times aided by the pre-addition of an acid (Metal Salts Chemistry). When mixed with wastewater, Metal Salts Chemistry causes a chemical reaction with the solubilized BOD. The Metal Salts Chemistry sufficiently lowers the pH of the wastewater stream to a typical target range of about 4.3-5.8 pH which facilitates precipitation/coagulation of blood components in water. In some instances, the pH for DAF float produced with Metal Salts Chemistry is below about 4.3 pH. A significant portion of the BOD becomes insoluble and, therefore, is available to be captured in the DAF float. In addition to being an effective wastewater treatment aid, Metal Salts Chemistry is significantly less expensive compared to other chemistries for reducing BOD. While Metal Salts Chemistry is effective at removing solubilized BOD from wastewater streams of poultry kill plants, this chemistry tends to create other challenges that appear in the DAF float itself. As an example, DAF float produced with Metal Salts Chemistry tends to retain more moisture than DAF float produced with other chemistries as water tends to stay bonded more tightly to the solids. The excessive moisture and increased weight makes DAF float treated with Metal Salts Chemistry more expensive to transport and to further process (i.e., de-water) compared to DAF float produced with alternative chemistries.

The primary alternative to Metal Salts Chemistry (and which is currently the most popular) is treatment of wastewater in a DAF with one or more polymers ("Polymer Chemistry"). In a poultry kill plant and breading plant operations (i.e. where chicken is coated, seasoned and fried typically in mixtures of soybean and/or canola oil), cationic polymers (which are positively charged and work best on biological material), in combination with other chemicals for pH control, etc., are used to catch the organic particles in the wastewater stream. While more expensive than Metal Salts Chemistry, Polymer Chemistry produces DAF float with less moisture content and lower water volume than DAF float produced by Metal Salts Chemistry, which might reduce the number of tanker loads required to dispose of the DAF float. In addition, Polymer treated DAF float sometimes produces marginally higher oil recovery.

Given Metal Salts Chemistry and Polymer Chemistry, the resulting DAF float exhibits the following volume and other characteristics that effect disposal of the DAF float. The issue of disposal of DAF Float is complicated in large part due to the sheer volume of DAF float produced by poultry kill plant and breading plant operations. While these plants vary in size and operation, it is not unusual for example for atypical U.S. poultry processing plant to produce in excess of 100,000 lbs. of DAF float per day from a wastewater stream of approximately 1 million gallons. Because of the large volume of water in the DAF float and the increasingly stringent government regulations on its disposal, the costs associated with DAF float disposal is very high. Specific Gravity Issues arise because DAF float is generated through a process where the constituent components of the DAF float (air/micro-bubbles, FOG, polymers and other solids taken out of solution) have a combined and/or overall specific gravity of less than 1, which allows the float to rise to the top of the water in the DAF tank (since the specific gravity of water is 1). This characteristic of the DAF float has been the primary problem such operations have had in efficiently and effectively drying the solids in the float to the point that the costs associated with sub-soil injection could be eliminated. Moisture Content Issues arise because, on average, the DAF float from a kill plant or breading plant operation might typically contain 80-90% moisture. In contrast, offal from a Poultry kill plant (e.g. the intestines and other parts of the bird not sold for human consumption) might contain an average of approximately 67% moisture.

The prevalent disposal method of DAF float is currently through sub-soil injection. Historically, some processors land applied their DAF float but current environmental laws have virtually eliminated this practice. In addition to disposal through sub-soil injection or land application, some processors have attempted to process their DAF Float into material for incorporation into animal feed. Since the DAF float from kill plants contains protein and fat (and that of breading plants contains oil, flour and, to a lesser extent, protein), processing the DAF Float to the point where renderers would purchase the DAF float solids for incorporation into animal feed is desirable. However, such attempts have, for the most part, not met with success.

Among the first entities to propose resource and/or by-product recovery as a method for eliminating DAF Float was Bird Environmental Systems and Services, Inc. ("BESS"). BESS's approach combined heating DAF float to 180-200 degrees F. and then processing the heated float through a 3-phase centrifuge. The objective of BESS's approach was to break down the DAF float into its three principle components: water, solids and oil, and the water then sent to the wastewater treatment plant. The solids might be sold to a renderer (i.e. protein from a Kill Plant and carbohydrates from a Breading Plaint) and the oil would have commercial value. BESS estimated that with their prescribed mode of operation the DAF float, on average, would be broken into the following constituents' parts: 90% water, 7% solids and 3% oil. Centrifuge equipment manufacturers will typically report that they can achieve 3-4% oil extraction by volume in DAF float produced by Metal Salts Chemistry and perhaps 5-6% in DAF float produced by Polymer Chemistry.

The primary reason centrifugation of DAF float has not become prevalent in the poultry and other food processing industries is that processors and equipment vendors have not been successful in dewatering the float to the point where the moisture content of the solids is low enough for renderers to be willing to purchase and/or use the solids (for incorporation into animal feed) or, alternatively, pass a paint filter test so the solids could at least be disposed of in a typical land fill. Moreover, given the characteristics of poultry DAF float, the centrifuges, as configured, are unable to produce clarified water for discharge from the centrifuges with sufficiently low moisture content. As a result, even where the processors are harvesting oil from their DAF float, the "high moisture" solids have to be pumped back into a DAF Float collection tank for eventual sub-soil injection and/or land application. Under such a scenario, the processors are, at best, defraying a portion of their sub-soil injection and/or land applications costs through the sale of the harvested oil.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, sludge of a poultry processing plant is processed with a sludge tank for containing the sludge, the sludge a dissolved air flotation system float (DAF float) treated with Polymer Chemistry; the sludge adjusted to a predetermined temperature range; a mixing tank to add polymer into the heated sludge to produce a slurry; and a decanter centrifuge. The decanter centrifuge comprises a bowl and a scroll, the scroll passing through a central longitudinal axis of the bowl and including a weir ring, wherein the scroll and the bowl rotate about the longitudinal axis in a same direction but with a differential rotation speed so as to provide a laminar flow of slurry in the decanter centrifuge. Rotation of the scroll and the bowl centrifugally separates the slurry into solids and at least one liquid phase and collects the solids on an inner surface of the bowl. The weir ring prevents solids from mixing with the at least one liquid phase, and the rotation of the scroll in combination with the differential rotation speed moves the solids from a cylinder section of the bowl toward a conical section of the bowl. The decanter centrifuge receives the slurry, provides the solids at a corresponding discharge port of the conical section, and provides the at least one liquid phase at a corresponding discharge port of the cylinder section, wherein the solids comprise 50% or less moisture content.

BRIEF DESCRIPTION OF THE DRAWING FIGURES

Other aspects, features, and advantages of the described embodiments will become more fully apparent from the following detailed description, the appended claims, and the accompanying drawings in which like reference numerals identify similar or identical elements.

DETAILED DESCRIPTION

In accordance with described embodiments, a system and method for waste solid reclamation from poultry plant waste includes a decanter centrifuge incorporating a weir for producing low moisture solids from poultry processing wastewater.

Figure 1:
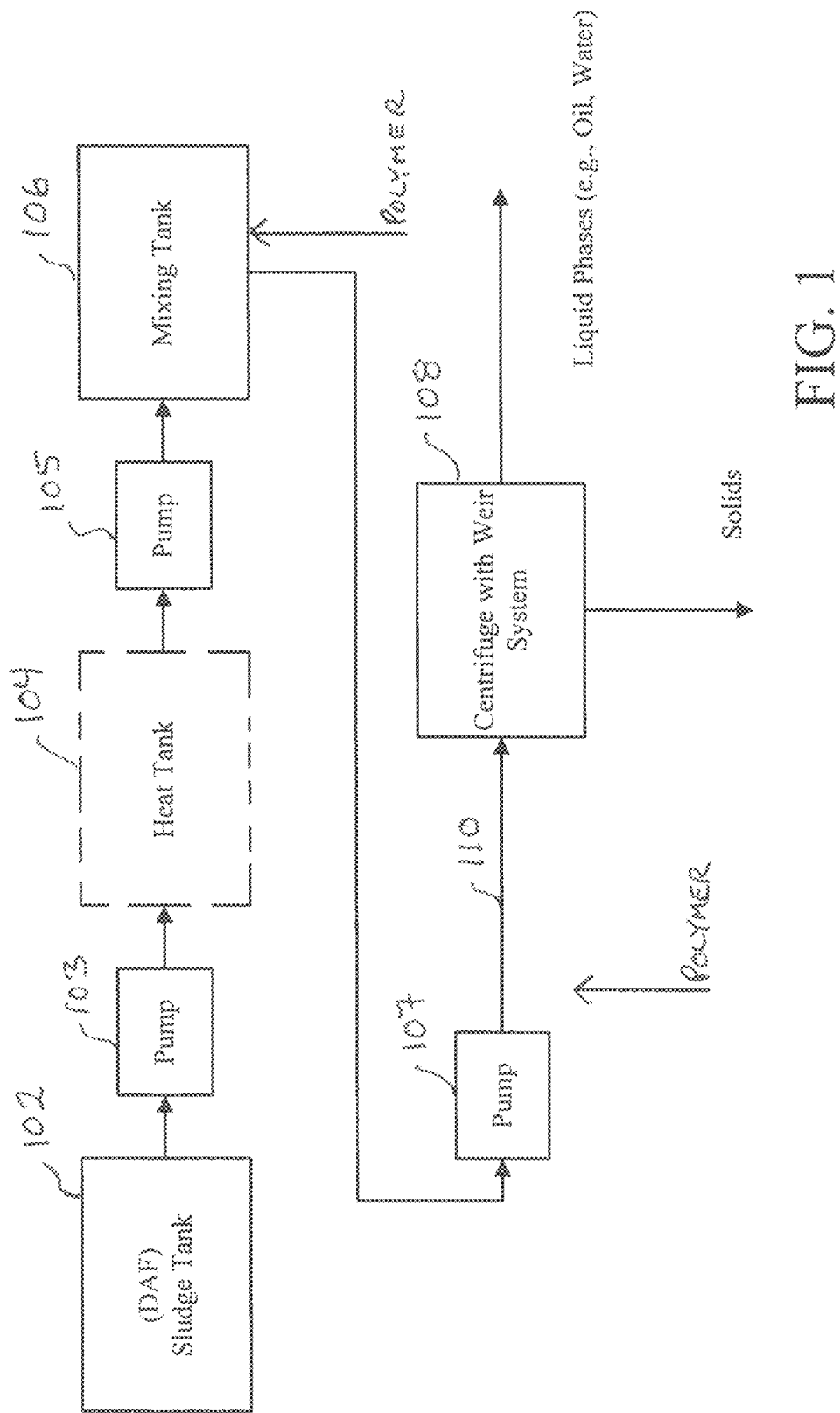
FIG. 1 shows a waste solid reclamation system in accordance with an illustrative embodiment.

FIG. 1 shows waste solid reclamation system 100 in accordance with an illustrative embodiment. Waste solid reclamation system 100 comprises DAF sludge tank 102 to receive dissolved air flotation (DAF) system float ("DAF float"), optional heat tank 104, mixing tank 106, and centrifuge with weir system 108. Pumps 103, 105 and 107 represent pumps employed to move the various forms of processed slurry along the path from DAF sludge tank 102 to centrifuge with weir system 108. A poultry kill plant or a poultry breading plant generally produces DAF float (also referred to as DAF sludge) for processing by waste solid reclamation system 100 into solids or cake (hereinafter "solids"). In addition, waste solid reclamation system 100 provides oil and water as a result of the separation of solids from the DAF float.

Figure 2:
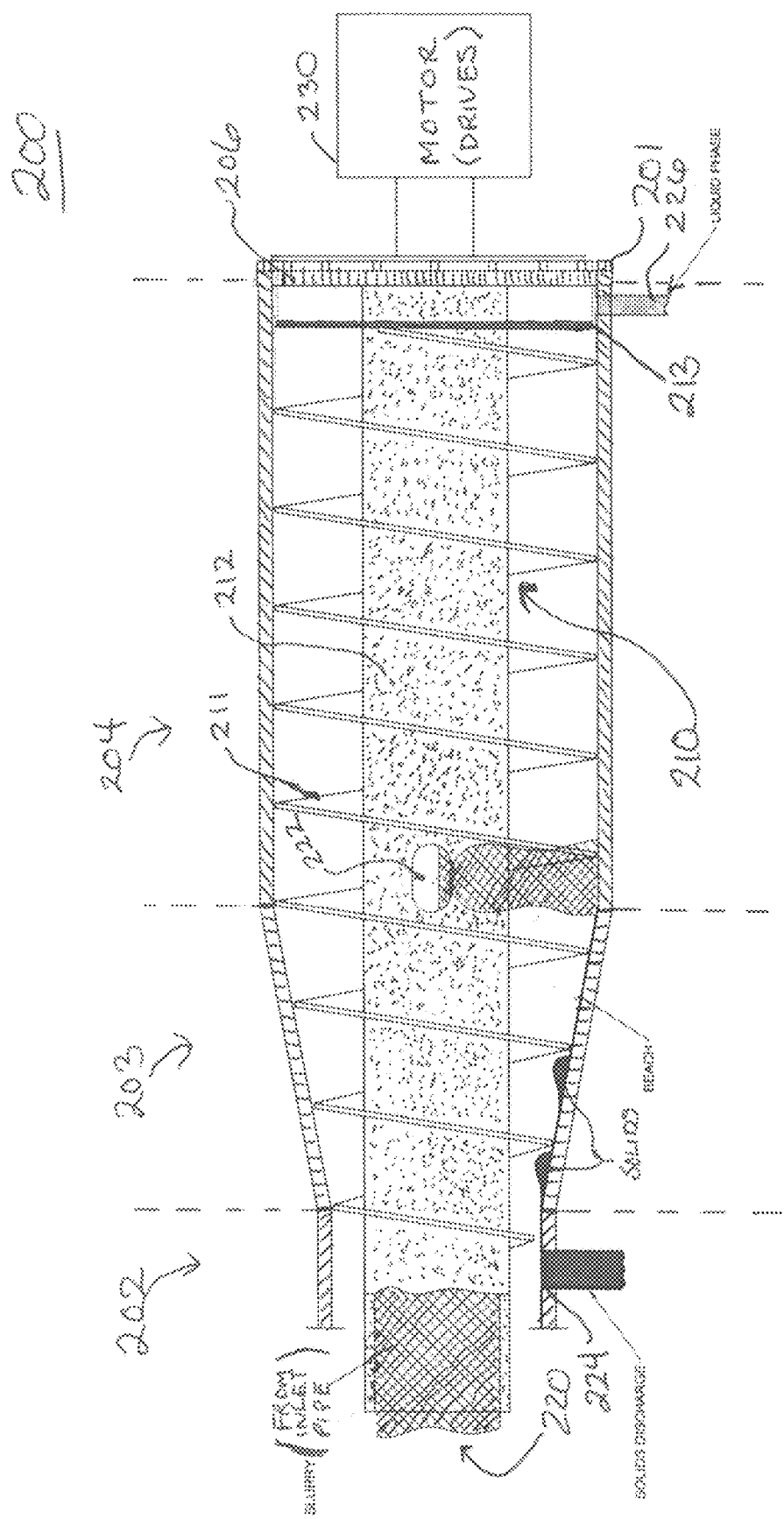
FIG. 2 shows an illustrative embodiment of decanter centrifuge for use with the centrifuge with weir system of FIG. 1.

Waste solid reclamation system 100 employs centrifuge with weir system 108. Centrifuge with weir system 108 comprises a decanter centrifuge having a weir in accordance with illustrative embodiments as described subsequently, as well as other components, such as devices to heat, press and further dry output solids, filters to clarify the liquids and oils, and other device known in the art for operation and safety (e.g., computers, sensors, etc.). FIG. 2 shows an illustrative embodiment of decanter centrifuge 200 for use centrifuge with weir system 108 of FIG. 1.

Decanter centrifuge 200 generally comprises an outer bowl 201 formed by neck section 202, conical section 203, cylinder section 204 and rear (end cap or wall of cylinder section) 206. A diameter of neck section 202 is less than a diameter of cylinder section 204, with conical section 203's diameter varying from between that of neck section 202 and cylinder section 204 to form the transition between neck section 202 and cylinder section 204.

Decanter centrifuge 200 further comprises an interior rotating screw-conveyor ("scroll") 210, slurry feed 222 for providing slurry onto scroll exterior of 210 to be processed, and discharge ports 224 and 226. Scroll 210 is formed by wall 211 extending radially from and spiraling along hub 212. Decanter centrifuge 200 further comprises an internal structure 213, referred to herein as a "weir ring" described in detail subsequently, formed at the end of scroll 210 and adjacent to rear 206 of cylinder section 204.

Slurry is provided from collection area 220 at neck section 202 into the interior of scroll 310 through hub 212 for output from slurry feed 222, where slurry feed 222 is provided as an opening in hub 212. Although shown as entering at neck section 202, in alternative embodiments slurry might be collected and passed into the interior of scroll 210 for output from slurry feed 222 by entering through the hub 212 at rear 206. Slurry feed 222 is generally positioned in the center of decanter centrifuge 200 in hub 212, and adjacent to the border between conical section 203 and cylinder section 204. Bowl 201 includes cylindrical section 204 where clarified water is discharged from discharge port 226, and conical section 203 where solids are discharged from discharge port 224.

In operation, outer bowl 201 of decanter centrifuge 200 rotates about a longitudinal axis, the bowl being provided with a solids discharge opening at the conical end of the bowl and a liquid phase(s) discharge opening at the opposite (cylindrical) end as described above. For illustrative embodiments, bowl 201 might be rotating at about 2400 revolutions per minute (RPM) about a longitudinal axis. Scroll 210 is disposed inside of bowl 201 for rotation about the longitudinal axis at a differential speed from that of bowl 201, which rotation might be less than 2400 RPM to create the differential. Scroll 210 is rotated so as to convey the deposited solids layer along the inner surface (or wall) of bowl 201 towards the solids discharge opening(s). As shown, the feed element extends into the scroll hub for delivering a feed slurry into a pool inside the bowl at approximately the center of the bowl. Bowl 201 and scroll 210 inside bowl 201 are both rotated at relatively high speed, but with different speeds by motor (drives, hydraulic assembly, etc.) 230 so that heavier solid particles (those with a specific gravity of greater than one) of input slurry introduced into the bowl are forced by centrifugation into a layer along the inner surface of bowl 201. Through the differential rotation of scroll 210 and bowl 201, the solids are conveyed by action of rotating, spiral wall 211 toward discharge port 224 at the conical end of the bowl (e.g., conical section 203). Additional discharge openings are provided at the cylindrical end (e.g., cylinder section 204) of the bowl near rear 206 for discharging the liquid phase(s) that are separated from the solids that collect within cylinder section 204 at discharge port 226.

Weir ring 213 is provided which extends radially outwardly from hub 212 of scroll 210 towards the inner surface of bowl 201 that extends from the longitudinal axis of the scroll to a position ("height") slightly below an outside diameter of scroll 210, which for described embodiments is the approximately ¼"-½" below the outside diameter of the scroll. In general, the height of the weir ring from the longitudinal axis of the scroll is dependent upon the percentage of solids in the feed for a given application. Weir ring 213 is generally closely positioned adjacent to rear 206. For described embodiments employing a DDS Decanter-Type-K652MC, the weir ring is placed approximately 6" inches from the cylindrical end of the bowl (depending on the length of the bowl) to trap the low density solids (generated from the production of poultry DAF float) for transmission to the conical end of the centrifuge for discharge through the solids discharge port. Depending on the embodiment, the position of the weir ring might be adjusted towards the slurry feed inlet to allow for three phase operation of the centrifuge, where liquid phases are further separated into water and oil.

The DAF float has a combined specific gravity of less than 1, and, therefore, because of its low density, causes flocs to float on the water and any oil in the float (rather than settling to the bowl) and so being easily drawn down to the conical end of the centrifuge by the scroll and discharged. The weir ring "traps" the flocs so they are generally not discharged with the liquid phase(s) at the cylindrical end of the bowl. In developing the illustrative embodiments, a DDS Decanter-Type-K652MC was modified to include the internal structure comprising the weir ring to capture the low density solids for transmission to the solids discharge port at the conical end of the bowl.

The design of a decanter centrifuge in accordance with illustrative embodiments generally depends on the size of the poultry plant and volume of slurry produced. However, the dimensions and relationship between dimensions of components of the decanter centrifuge for an embodiment might scale up or scale down linearly. An illustrative set of dimensions for a decanter centrifuge that is relatively small might be as follows: length of centrifuge is approximately 51¼", diameter of hub of scroll is approximately 7½", outer diameter of scroll is approximately 16½", pitch of screw formed by wall on scroll is approximately 5", diameter of weir ring is approximately 16¼", inside diameter of the outer bowl is 16¾", and distance of weir ring to rear of cylinder is $^{15}/_{16}$" to 1⅞".

Returning to waste solid reclamation system in accordance with the illustrative embodiment of FIG. 1, operation of decanter centrifuge 200 of FIG. 2 requires chemical conditioning of the slurry applied to slurry feed 222. Since poultry DAF float is comprised of biological material, processors utilize Polymer Chemistry and use cationic polymers in the poultry DAFs. From DAF sludge tank 102, the DAF float is pumped (by pump 103) through a heat exchanger of optional heat tank 104, heating (usually by steam) the DAF float to between 35-50 degrees Celsius (95 to 122 degrees Fahrenheit). Heat tank 104 is shown as optional since the temperature of the sludge might vary depending upon environment of the poultry plant producing the sludge. In some plants (for example, in the Southern United States) the general temperature might be high enough not to require heating, while a plant in the northern United States might require heating. Other embodiments might require cooling of the sludge, in which case the heat tank would operate a heat exchanger in reverse. In general, heat tank 104 represents an operation to produce temperature-adjusted DAF float for proper operation of polymer addition and centrifugal separation by decanter centrifuge 200.

The temperature-adjusted DAF float from heat tank 104 is then pumped (by pump 105) into mixing tank 106 to dose (usually) with the same cationic polymer used to generate the DAF float to minimize chemical costs. For the described embodiment, the cationic polymer used to develop the operation was DS801 FG, purchased from Dolphin Services and Chemicals, LLC.

Pump 107 is used to transport the slurry to decanter centrifuge 200 via inlet pipe 110. After the DAF float is heated and mixed with cationic polymer to dose the slurry, preferably cationic polymer is injected at the inlet pipe 110 after feed pump 107 from mixing tank 106 to avoid shear. The polymer feed line is preferably approximately 10'-15' from the feed inlet (e.g., collection area 220 of FIG. 2) of the decanter centrifuge (e.g., decanter centrifuge 200) or a static mixer (not shown in the FIGs.) used to allow sufficient time for the polymer to activate and tighten the binding of the substrates of the flocs. The process described between mixing tank 106 and chemical conditioning of the slurry applied to slurry feed 222 is adjusted depending on the specific embodiment to provide a feed rate through slurry feed 222 for near optimal performance of separation of the slurry into solids and liquid phases by decanter centrifuge 200.

Temperature is an important factor that impacts float conditioning, optimum polymer dose, and thickening/dewatering performance. Since the constituent components of poultry DAF float are not homogenous (e.g. there are obviously differences between poultry kill plant and poultry breading plant DAF float, but differences also exist within each of these types of DAF float at any given time), the exact dosage of polymer will vary. However, for the described embodiment, near optimal performance might be achieved at approximately 50 degrees Celsius at a polymer dose of approximately 19.2 g/kg DS. (See, for example, "Effect of Sludge Conditioning Temperature on the Thickening and Dewatering Performance of Polymers", Journal of Residuals Science & Technology, Vol. 13, No. 3—July 2016). Increasing the float temperature to 60 degrees Celsius or higher increases the polymer demand up to 38.5 g/kg DS and deteriorates the thickening and dewatering performance. Many cationic polymers are generally recognized as safe for animal ingestion that, therefore, allows the solids to be incorporated into animal feed.

The use of the weir ring, in conjunction with i) operating the decanter centrifuge with a laminar flow and ii) adjusting the feed rate and cationic polymer dosing as described herein, allows for the production of low moisture solids from the processing of poultry DAF float and discharge of a clear liquid phase. Once near optimal operating parameters are achieved for a given embodiment at a given poultry processing plant, solids might be produced with a moisture content well less than 50%. As a result, the solids might be available to renderers (in the case of poultry kill plant solids produced with Polymer Chemistry), for the protein and residual oil value and, (in the case of Breading Plant solids), for the carbohydrate and residual oil value or, alternatively, disposed of at a typical land fill. Whether the process described herein is used at a poultry kill plant or poultry breading plant, use of the described embodiments avoids use costly sub-soil injection for waste solids disposal.

In addition to the production of low moisture solids, the fat, in the case of poultry kill plant DAF float, and the combination of oils, typically soybean and/or canola oil, in the case of a poultry breading plant, might also be harvested through a variety of measures including, but not limited to, using a three phase centrifuge (modified with an internal structure including a weir ring as described herein), naturally allowing the liquid phases (oil and water) to separate in a collection tank after discharge from the centrifuge and/or using chemically enhanced fat and/or oil extraction prior to polymer dosing into the feed line of the centrifuge.

The illustrative embodiments produce waste solids with a low moisture content, generally less than 50%, which is sufficient to pass a "paint filter" test well-known in the art. In a paint filter test, the solids are provided to a filter with holes having a specified hole-diameter and, to pass the test, should be captured by the filter. In connection therewith, various methods have been proposed that involve the addition of structures within the bowl to exert pressure on the solids as they are conveyed to the conical end of the bowl for discharge to reduce moisture content even further. See, for example, U.S. Pat. No. 5,695,442, titled "DECANTER CENTRIFUGE AND ASSOCIATED METHOD FOR PRODUCING CAKE WITH REDUCED MOISTURE CONTENT AND HIGH THROUGHPUT, to Leung et al., filed Jan. 31, 1996, issued Dec. 9, 1997, the teachings of which are incorporated herein in their entirety by reference, for a discussion of such structures, which primarily involve adding internal structures proximate to the solids discharge ports.

In conjunction with the addition of the weir ring, variable frequency drives (e.g., variable frequency drive for motors 230 of FIG. 2) allow for the adjustment of the speed of the bowl and sludge feed rate, as well as a hydraulic back drive to control the speed of the scroll for the bowl and scroll drive system used to create near optimal speed differential for the implementation of the described embodiment. To make effective and efficient use of the weir ring, the scroll and bowl differential is reduced to the point that a laminar flow is present (rather than a turbulent flow) inside the centrifuge so the solids, which due to the constituent components thereof (including any oil and/or air trapped in the float) have a specific gravity of less than 1, might be separated from the liquid phase, with the solids being conveyed to the inner surface of the conical section (sometimes referred to in the art as the "beach" of the centrifuge) and discharged through the solids discharge port(s).

The differential rotation speed between the scroll and bowl required to create a laminar flow in connection with the processing of poultry DAF float was approximately 8-15 RPMs in the described embodiment for a slurry produced by a poultry kill plant. The differential is adjusted as needed, in conjunction with the slurry feed rate, to attain a laminar flow so that the liquid phase(s) have little or no low density solids contained therein.

For a poultry processing plant where breading and/or cooking takes place (i.e., a breading plant where slurry is comprised primarily of oil, flour and muscle tissue (raw and cooked)), the described embodiment might vary as follows. The differential rotation speed between the scroll and bowl might be less for a poultry breading plant: for example, approximately 6-8 RPMs, which is lower than 8-15 RPMs for slurry generated by a poultry kill plant (comprised primarily of fat, blood and raw muscle tissue). Moisture content attributable to water might be on the order of 47.2%. While 47.2% might be higher than is achieved with the poultry kill plant embodiment, moisture content is below 50%, which is required to pass the paint filter test, the described process herein produces dried solids with a moisture content (in relation to both kill/breading/cooking plant sludge) less than that coming off a DAF float, which is usually in the 80-90% moisture content range.

Figure 3:
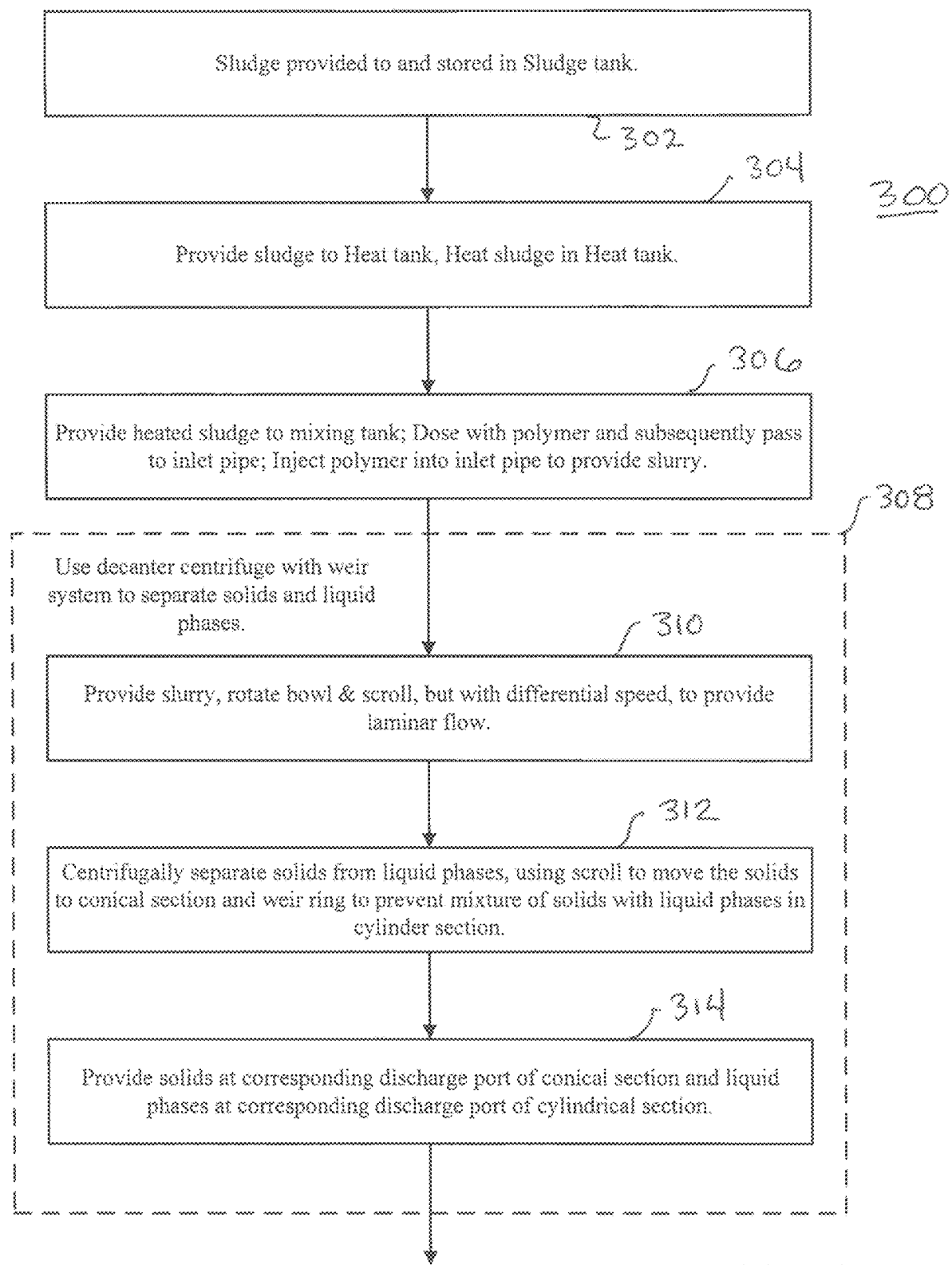
FIG. 3 shows an illustrative method of processing sludge of a poultry processing plant into solids.

FIG. 3 shows an illustrative method 300 of processing sludge of a poultry processing plant into solids. At step 302, the sludge is stored in a sludge tank, the sludge a dissolved air flotation system float (DAF float) treated with Polymer Chemistry. At step 304, a heat tank optionally heats or otherwise temperature-adjusts the sludge from the sludge tank to a predetermined temperature range as generally described herein. At step 306, a mixing tank is employed to add polymer by dosing to the heated sludge, and additional polymer is injected (while preventing shear) via an inlet pipe to produce a slurry. At step 308, the decanter centrifuge, incorporating the weir ring as described for the illustrative embodiments, separates the slurry into the solids and at least one liquid phase (e.g., oil and water). Step 308 includes step 310, rotating the scroll and the bowl about the longitudinal axis in a same direction, but with a differential rotation speed, providing a laminar flow of slurry in the decanter centrifuge. Step 308 further includes step 312, rotating the scroll and the bowl centrifugally separating the slurry into the solids and the at least one liquid phase, thereby collecting the solids on an inner surface of the bowl, with the weir ring preventing solids from mixing with the at least one liquid phase, and the rotating the scroll in combination with the differential rotation speed moves the solids from a cylinder section of the bowl toward a conical section of the bowl. Step 308 further includes step 314, providing the solids at a corresponding discharge port of the conical section, and providing the at least one liquid phase at a corresponding discharge port of the cylinder section, wherein the solids comprise 50% or less moisture content.

Reference herein to "one embodiment" or "an embodiment" means that a particular feature, structure, or characteristic described in connection with the embodiment can be included in at least one embodiment. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Although the subject matter described herein may be described in the context of illustrative implementations to process one or more application features/operations, the subject matter is not limited to these particular embodiments. Rather, the techniques described herein can be applied to any suitable type of user-interactive component execution management methods, systems, platforms, and/or apparatus. The described subject matter can be embodied in the form of methods and apparatuses for practicing those methods.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the illustrative methods set forth herein are not necessarily required to be performed in the order described, and the order of the steps of such methods should be understood to be merely examples. Likewise, additional steps may be included in such methods, and certain steps may be omitted or combined, in methods consistent with various embodiments.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Further, the term "comprises or includes" and/or "comprising or including" used in the document means that one or more other components, steps, operation and/or existence or addition of elements are not excluded in addition to the described components, steps, operation and/or elements.

No claim element herein is to be construed under the provisions of 35 U.S.C. § 112, sixth paragraph, unless the element is expressly recited using the phrase "means for" or "step for."

It is understood that various changes in the details, materials, and arrangements of the parts which have been described and illustrated herein may be made by those skilled in the art without departing from the scope of the embodiments as encompassed in the following claims.

I claim:

1. A method of processing sludge of a poultry processing plant into solids, the method comprising:
    storing the sludge in a sludge tank, the sludge a dissolved air flotation system float (DAF float) treated with Polymer Chemistry;
    adjusting the sludge in the sludge tank to a predetermined temperature range;
    adding, in a mixing tank, polymer into the sludge and producing a slurry; and
    separating, with a decanter centrifuge, the slurry into the solids and at least one liquid phase, the decanter centrifuge comprising a bowl and a scroll, the scroll passing through a central longitudinal axis of the bowl and including a weir ring, wherein the separating with the decanter centrifuge comprises:
        rotating the scroll and the bowl about the longitudinal axis in a same direction, but with a differential rotation speed, providing a laminar flow of slurry in the decanter centrifuge, and
        rotating the scroll and the bowl centrifugally separating the slurry into the solids and the at least one liquid phase, collecting the solids on an inner surface of the bowl, the weir ring preventing the solids from mixing with the at least one liquid phase, and the rotating the scroll in combination with the differential rotation speed moves the solids from a cylinder section of the bowl toward a conical section of the bowl; and providing the solids at a corresponding discharge port of the conical section, and providing the at least one liquid phase at a corresponding one of one or more discharge ports of the cylinder section, wherein the solids comprise 50% or less moisture content, and wherein the weir ring (i) extends radially outwardly from a hub of the scroll towards an inner surface of the bowl, and (ii) extends from the longitudinal axis of the scroll to a position below an outside diameter of scroll, the weir ring positioned adjacent to a rear of the cylinder section of the bowl, in front of the one or more discharge ports of the cylinder section of the bowl, and opposite to the conical section of the bowl.

2. The method of claim 1, comprising:
coupling the mixing tank to the decanter centrifuge via an inlet pipe;
dosing, within the mixing tank, the sludge with polymer; and
injecting, at the inlet pipe, additional polymer into the dosed sludge, the injecting providing the slurry.

3. The method of claim 1, wherein, for the processing sludge, the poultry processing plant is a poultry kill plant.

4. The method of claim 3, wherein, for the rotating the scroll and the bowl about the longitudinal axis in the same direction, the differential rotation speed between the scroll and the bowl is between approximately 6-15 revolutions per minute (RPMs).

5. The method of claim 1, wherein, for the processing sludge, the poultry processing plant is a poultry breading plant.

6. The method of claim 5, wherein, for the rotating the scroll and the bowl about the longitudinal axis in the same direction, the differential rotation speed between the scroll and the bowl is between approximately 6-8 revolutions per minute (RPMs).

7. The method of claim 1, wherein, for the separating, with the decanter centrifuge, the slurry into the solids and the at least one liquid phase, the at least one liquid phase includes oil and water.

8. Solids from processed sludge of a poultry processing plant, the solids generated by:
storing the sludge in a sludge tank, the sludge a dissolved air flotation system float (DAF float) treated with Polymer Chemistry;
adjusting the sludge in the sludge tank to a predetermined temperature range;
adding, in a mixing tank, polymer into the sludge and producing a slurry; and
separating, with a decanter centrifuge, the slurry into the solids and at least one liquid phase, the decanter centrifuge comprising a bowl and a scroll, the scroll passing through a central longitudinal axis of the bowl and including a weir ring, wherein the separating with the decanter centrifuge comprises rotating the scroll and the bowl about the longitudinal axis in a same direction, but with a differential rotation speed, providing a laminar flow of slurry in the decanter centrifuge, and rotating the scroll and the bowl centrifugally separating the slurry into the solids and the at least one liquid phase, collecting the solids on an inner surface of the bowl, the weir ring preventing the solids from mixing with the at least one liquid phase, and the rotating the scroll in combination with the differential rotation speed moves the solids from a cylinder section of the bowl toward a conical section of the bowl; and providing the solids at a corresponding discharge port of the conical section, and providing the at least one liquid phase at a corresponding one of one or more discharge ports of the cylinder section, wherein the solids comprise 50% or less moisture content, and wherein the weir ring (i) extends radially outwardly from a hub of the scroll towards an inner surface of the bowl, and (ii) extends from the longitudinal axis of the scroll to a position below an outside diameter of scroll, the weir ring positioned adjacent to a rear of the cylinder section of the bowl, in front of the one or more discharge ports of the cylinder section of the bowl, and opposite to the conical section of the bowl.

9. The solids of claim 8, wherein:
coupling the mixing tank to the decanter centrifuge via an inlet pipe;
dosing, within the mixing tank, the heated sludge with polymer; and
injecting, at the inlet pipe, additional polymer into the heated, dosed sludge, the injecting providing the slurry.

10. The solids of claim 8, wherein, for the processing sludge, the poultry processing plant is a poultry kill plant.

11. The solids of claim 10, wherein, for the rotating the scroll and the bowl about the longitudinal axis in the same direction, the differential rotation speed between the scroll and the bowl is between approximately 8-15 revolutions per minute (RPMs).

12. The solids of claim 8, wherein, for the processing sludge, the poultry processing plant is a poultry breading plant.

13. The solids of claim 12, wherein, for the rotating the scroll and the bowl about the longitudinal axis in the same direction, the differential rotation speed between the scroll and the bowl is between approximately 6-8 revolutions per minute (RPMs).

14. The solids of claim 8, wherein, for the separating, with the decanter centrifuge, the slurry into the solids and the at least one liquid phase, the at least one liquid phase includes oil and water.

* * * * *